Sept. 14, 1937.  F. L. O. WADSWORTH  2,092,864
SHEAR MECHANISM
Original Filed Feb. 11, 1933
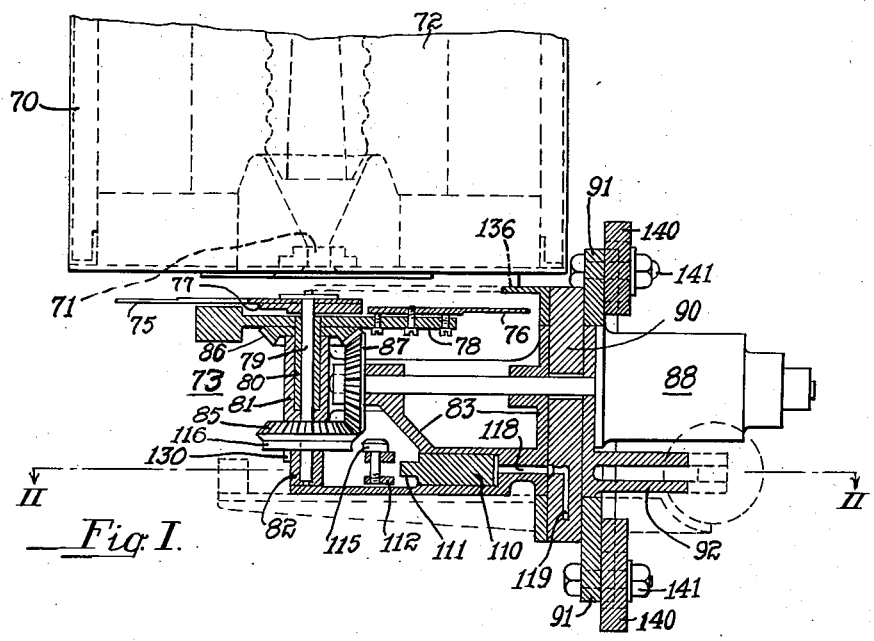
INVENTOR
Frank L. O. Wadsworth
By Green & McCallister
his Attorneys Patented Sept. 14, 1937

2,092,864

UNITED STATES PATENT OFFICE 2,092,864

SHEAR MECHANISM

Frank L. O. Wadsworth, Pittsburgh, Pa., assignor to Ball Brothers Company, Muncie, Ind., a corporation of Indiana Original application February 11, 1933, Serial No. 656,306. Divided and this application December 9, 1933, Serial No. 701,635. Renewed March 2, 1936

32 Claims. (Cl. 49—14)

This invention relates to a shear mechanism for severing a stream of molten glass into a series of successive individual gobs or mold charges and is a division of my copending application, Serial No. 656,306, filed Feb. 11, 1933.

One object of the present invention is to provide a mechanism for severing a continuously flowing stream of molten glass into separate mold charges which will sever the stream without arresting its continuous flow and without subjecting it to any appreciable cooling effect during such cutting action.

Another object is to provide a novel type of high speed or super-speed shear mechanism which is adapted to effect the severance of a continuously flowing stream of molten glass in a very small fraction of the time usually required for such operation.

A further object is to provide an improved super-speed cutting mechanism in which the two shear blades revolve continuously in opposite directions and are periodically projected into, and withdrawn, from the path of the outflowing stream of glass to instantaneously cut off successive mold charges therefrom and deliver them to the receptacles on the forming machine.

Other special objects of the present invention will be rendered apparent to those skilled in this art by the following description of one illustrative form of my shear mechanism that is depicted in the accompanying drawing, in which:

Figure 1 is a view partly in vertical section and partly in elevation of my improved shear mechanism, showing its relation to the forehearth of a glass melting furnace or tank;

Fig. 2 is a horizontal section taken on line II—II of Fig. 1;

Fig. 3 is a sectional view showing a certain feature of my shear mechanism;

Fig. 4 is an enlarged sectional view similar to Fig. 3, and

Fig. 5 is a sectional view showing another feature of my shear mechanism.

In the drawing I have shown my improved shear mechanism attached to the bottom of the forehearth or boot 70 of a glass melting furnace or tank. The molten glass passes from the tank into the forehearth 70 and flows in a continuous stream through an orifice 71 in the bottom thereof. The flow of glass through the orifice 71 may be accelerated by an air bell or segregation chamber 72 positioned above the orifice and operated in accordance with the practice set forth in the parent application. As the stream of glass issues from the orifice 71 it is cut into successive individual mold charges by my improved shearing mechanism 73 disposed beneath the forehearth 70 and mounted on the angle posts (not shown) supporting the forehearth on the furnace.

In the construction here shown the shear mechanism 73 comprises two shear blades 75—76 (which may be either of the straight blade, or of the usual notched blade, "cat's eye", form) are removably attached to two arms 77 and 78 that are respectively keyed to a central vertical shaft 79 and an outer tubular sleeve 80, which are mounted to revolve concentrically in the bearing members 81 and 82 of a U-shaped frame 83. The connected members, 75—77—79, and 76—78—80 are continuously rotated in opposite directions, at the same angular speed, by two bevel pinions 85 and 86 (that are secured respectively to the shaft 79 and the sleeve member 80), and an interposed bevel gear 87 that is driven by the motor 88.

The member 83—which forms a common unit support for all of the above-described elements of the shear mechanism—is adapted to rock, or swing, on a vertical trunnion member 90, that is carried by the open stem portion of a T-shaped frame 91; and is provided with a forked arm 92 which is coupled, by the link 93, to the piston member 94 of a cylinder 95 that is supported on the head portion of this frame. The oppositely extending side of the T head carries a valve box 96, in which is mounted a reciprocable double piston valve, 100—101 that serves to control the admission and exhaust of air to and from the cylinder 95, and the resultant angular movement of the shear supporting frame 83. This control is effected as follows:

The front chamber of the valve box 96 is connected to the compressed air line leading from a suitable source of supply to the air bell 72, through a pipe 97, and a suitable timer valve assembly (not shown) that may be actuated in any desired manner, such as by a cam on the main cam shaft of the feeder. A port 99 leads from this part of the box 96 to the rear chamber in which the piston valve elements 100—101 are located; and a second port and pipe connection 102 leads from the central part of this chamber to the rear end of the cylinder 95. The piston valve chamber is also provided with two exhaust ports 103 and 104 (see enlarged view of Fig. 4)—which are positioned on opposite sides of the head 101—and with a vent port 105 that is located in front of the head 100. The stem 106 of the piston valve member, 100—101, is reduced in diameter at the point where it enters the front chamber; and a disc valve element 108 is slidably mounted on this reduced portion, and is normally held in open position (against the adjacent face of the front chamber of the valve box) by the spring 109.

The lower part of the swinging frame support 83 is bored to receive a piston member 110 that is provided at its front end with an arm or lug 111, which forms a pivot support for a forked lever 112. The two arms of this lever are thickened or brought together, at their outer ends to form a narrow slot through which the piston valve stem 106 passes; and this stem carries an adjustable collar 114 that is adapted to be engaged by the thickened ends of the lever arms. The upper arm of the lever 112 carries a cam roller 115, which is adapted to engage with a cam disc 116 on the bevel pinion 85, when the piston 110 is moved forward to the position shown in Fig. 2.

The rear end of the piston (110) cylinder is connected to the port 99 by the passageways 118—119 and 120, which are formed in the hub of the swinging frame 83 and the stationary trunnion supports 90 and 91. The piston 110 is normally held in its retracted position—with the cam roller 115 out of engagement with the cam disc 116—by a spring 121; and an adjustable stop member 122 is provided to limit its forward movement. A second spring 125 which is attached to the end of the forked arm 92, serves to normally hold the shear supporting frame 83 in the full line position shown in Figs. 1 and 2; and in this position the path of movement of the shear blades does not intersect the line of flow of the glass stream.

When it is desired to effect a severing operation, compressed air is admitted to the line 97 by the action of the timer valve 98; but is prevented from reaching the cylinder 95 by the piston valve head 101, until the latter has been moved from the position shown in Fig. 2 to that shown in Fig. 3. This movement—which must be so timed that the continuously revolving shear blades meet and pass each other on the axis of the flowing stream—is effected by the piston-lever-cam elements 110—112—115—116. The admission of compressed air to the line 97, and the front chamber of the valve box 96—and thence to the ports and passageways 99—120, etc.—moves the piston 110 forward and brings the cam roller 115 into contact with the cam disc 116. The parts are so arranged and adjusted that the lobe of this cam—which is revolving clockwise as viewed in Fig. 2—engages the roller 115 at the time when the two shear blades have moved from the position shown in full lines in Fig. 1 (where the axis of one blade (75)—79, and the axis of the other (i. e. 76) is in the plane II—II) to the crossing position indicated by the dotted line 79—S; and when this engagement occurs, the lever 112 is rocked to the right and moves the piston valve elements 100—101 to the full line position of Fig. 3. This movement closes the exhaust port 103, and permits the compressed air to pass from the port 99 to the port 102 and to the rear of the piston 94. This immediately swings the shear frame assembly forwardly until it meets the adjustable stop 127 on the frame 91, and the next revolution of the shear arms will cause the shear blades to meet and cross on the axis F (in the plane I—I) of the flowing stream, and almost instantaneously sever the latter. As indicative of the very short interval required in this cutting operation, let us assume—as here shown—that the effective radius of action is approximately 7.5 inches and that the speed of revolution is 1200 R. P. M. (20 R. P. S.). The linear speed of each blade is then about 950 inches per second; and the time required to sever a two inch diameter stream is only a little more than 0.001 second.

After each severance it is, of course, necessary to immediately swing the shear frame back from its operative position; and this may be effected in the following manner: The cam disc 116 is provided, on its lower side, with a pin or roller 130, and the valve stem 106 with an adjustable cam block 131; and these cooperating elements (130—131) are so positioned that as the shear blades meet and cross, on the axis F, the pin engages the block 131 and moves the valve elements 100—101 to the left and into the position shown in Fig. 4—this movement being sufficient to also close the disc valve 108 against the pressure of the spring 109. This movement shuts off the flow of compressed air to the port 99 and opens both of the exhaust ports 103 and 104, thus permitting the piston members 94 and 110 to be immediately retracted, by the action of the springs 125 and 121. The valve elements 100—101—108 will, however, be held in their last-described position, by the pressure of the compressed air on the face of the disc valve 108, until the timer valve assembly acts to open the line 97 to the atmosphere; and when this occurs, the spring 109 will return the valve parts to their original intermediate position (shown in Fig. 2) in readiness for the next operation.

It will be observed that the advance and the retraction of the shear blade assembly—to carry the line of movement of the blades into and away from the path of the flowing stream—is not dependent upon any exact setting or adjustment of the timer valve mechanism, but is controlled and determined (after the timer valve is actuated to admit compressed air to the line 97) by the rotation of the shear arms themselves; and that any slight irregularities or momentary changes either in the action of the timer valve cam, or in the speed of the motor 88, cannot sensibly affect the interval between successive severing operations, or the establishment of a proper registration between the rotary and the transverse movements of the cutting elements.

Since the blades of my improved "superspeed" shear mechanism are revolving continuously, and must of course cross each other twice in each revolution, it is desirable to avoid bringing them into "wiping" contact except at such times as they are engaged in severing the glass stream. I accomplish this object by interposing a light spring 135 between the adjacent faces of the arms 77 and 78 (see enlarged view of Fig. 5), and by providing a beveled end arm 136, which is supported by the frame 91, and which extends out to such a position that when the frame 83 is swung forward to cutting position the end of this arm engages the coned or rounded extremity of the shaft 79 and presses the upper shear blade arm 77 down against the lower arm 78;— the shear blades themselves being so shaped and so adjusted (as shown in Fig. 1) that the cutting edges will then "ride up" on each other, at the instant of crossing, and effect a clean sharp unmarked severance of the molten material.

I desire it to be understood that I have devised various shearing structures and various shearing procedures for severing a continuously flowing stream of molten glass to produce well formed mold charges in which rotating shear blades are moved into the stream to effect the severance and that such mechanisms and procedures form the subject matter of and are claimed in copending applications for patent and structurally and functionally distinguish from the features herein claimed.

The mechanical structure which is herein illustrated and described is only one of many which I have designed for practicing my invention and with the present disclosure as a guide those skilled in this art can readily devise other forms of construction which will embody the whole or part of the improvements which are defined in the following claims.

What I claim is:

1. A glass feeder shear mechanism comprising two shear blades, a mechanism for continuously rotating the blades, means for moving said rotating blades toward and away from a cutting position during their rotation, and means dependent on the position in its rotation of one such blade for controlling the operation of said first mentioned means.

2. In combination with a glass feeder having a glass delivery outlet, a pair of shear blades for cutting charges of glass from glass issuing from the outlet, a mechanism for rotating the blades, means for moving said blades toward and from said outlet, and means dependent on the position of one of said blades during its rotation for controlling the operation of said first mentioned means.

3. In combination with a glass feeder having a glass delivery outlet, a pair of shear blades for cutting charges of glass from glass issuing from the outlet, a mechanism for rotating the blades, means for moving said blades toward and from said outlet, and means dependent on the position of said blades with relation to such outlet for moving one blade into cutting engagement with the other.

4. In combination with a glass feeder, having a glass delivery outlet, a pair of shear blades for cutting charges of glass issuing from said outlet, a mechanism for continuously rotating said shear blades, means for moving said blades toward and from said outlet during their rotation, means dependent on the relative positions of such blades during their rotation for controlling the operation of said first mentioned means, means for normally holding said blades out of engagement with each other, and means dependent on the position of said blades with relation to such outlet for moving such blades into cutting engagement.

5. A shear mechanism comprising a pair of blades, coaxial mounting devices for such blades, a mechanism for rotating such blades in opposite directions so that they pass each other twice in each revolution, means for moving said blades toward and away from a cutting position, and means actuated by the rotation of one of said blades for controlling the operation of said first mentioned means.

6. A shear mechanism comprising two blades, coaxial mounting devices for such blades, a mechanism for rotating such blades in opposite directions about a common axis, means for moving said blades during their rotation toward a cutting position, a control device for said last mentioned means, and means rotating with one such blade for actuating said control device.

7. A shear mechanism comprising two blades, coaxial mounting devices for such blades, a mechanism for rotating such blades in opposite directions about a common axis, means for moving such blades toward and away from a cutting position during their rotation, and means dependent on the rotation of at least one of said blades for initiating both movements of said first mentioned means.

8. A shear apparatus comprising two blades rotatably mounted on a common axis, a mechanism for rotating said blades in opposite directions, means for swinging the axis of said rotating blades to move the blades toward a cutting position, control device for said first mentioned means and rotating means controlling the operation of said control device.

9. A shear apparatus comprising two blades rotatably mounted on a common axis, a mechanism for rotating said blades in opposite directions, means for swinging the axis to move said blades toward and away from a cutting position during their rotation, and means actuated by said mechanism for controlling the operation of said means.

10. A shear apparatus comprising two coaxially mounted blades, a mechanism for rotating said blades in opposite directions, instrumentalities for moving said blades toward and away from a cutting position during their rotation, and rotating means for controlling the operation of said instrumentalities.

11. A method of cutting mold charges from a suspended mass of molten glass by means of two oppositely moving shear blades, which consists in rotating such blades in opposite directions, moving said blades to advance the point of intersection of the blades into the axis of the mass and timing such movement of said blades by their rotation.

12. A method of operating two opposed shear blades, which consists in rotating such blades so that they pass each other at least once during each revolution while maintaining such blades out of contact, one with the other, moving such blades into a cutting position during their rotation and causing said blades to contact one with the other while in such cutting position.

13. A method of operating two opposed shear blades, which consists in continuously rotating such blades in opposite directions while holding them out of contact with each other, moving such blades into a cutting position during the period intervening between the passing of said blades, and causing such blades to contact one with the other in passing each other at the cutting position, then withdrawing said blades from the cutting position and causing them to move apart so that they do not contact on passing.

14. A shear apparatus comprising shear blades rotatably mounted on a common axis, a mechanism for continuously rotating said blades, an instrumentality for holding said blades out of contact during such rotation, means for swinging the axis through an arc to move said blades toward and away from a cutting position during their rotation about such axis, a rotating device for controlling the operation of said means, and means for moving said blades into contact as they pass each other at the cutting position.

15. A shear apparatus comprising a pair of coaxially mounted shear blades, mechanism for rotating said blades in opposite directions, means for swinging the common mounting of said blades through an arc to move the shear blades toward and away from cutting position, an instrumentality for holding said rotating blades out of contact as they cross each other when the axis of said blades is in one position, and means for causing said blades to contact one with the other as they cross each other when the common mounting of said blades is moved to its other position.

16. A shear apparatus comprising a movable frame, shear blades rotatively mounted on said frame, mechanism for rotating said blades, and means for swinging said frame to move said blades toward and away from cutting position.

17. A shear apparatus comprising a frame, a pair of shear blades mounted on said frame, means for rotating said blades, means for actuating said frame to move said blades toward and away from cutting position and means dependent on the position of said blades for controlling the operation of said frame actuating means.

18. A shear apparatus comprising a frame, shear blades rotatably mounted on a common axis in said frame, means for rotating said blades in opposite directions, means for oscillating said frame to move said blades toward and away from cutting position, means for holding said blades out of contact as they cross each other when the frame is at one end of its travel and means for causing said blades to contact as they cross each other when the frame is at the other end of its travel.

19. A shear apparatus comprising a frame, shear blades mounted on said frame, means for rotating said blades, means for oscillating said frame to move said blades toward and away from cutting position, means for holding said blades out of contact as they cross each other when the frame is at one end of its travel, means for causing said blades to contact as they cross each other when the frame is at the other end of its travel and means actuated by the rotation of said blades for controlling the operation of said frame oscillating means.

20. A shear mechanism comprising a frame, shear blades coaxially mounted in said frame, means for continuously rotating said blades to move said blades across each other in cutting relation, and means depending upon the rotation of said blades for oscillating said frame to move the blades into and out of cutting position, including a rotating member associated with said blades, and means periodically movable into contact with said member for controlling the operation of said frame swinging means.

21. A shear mechanism comprising a movable frame, shear blades rotatively mounted on said frame, means for continuously rotating said blades, and means dependent upon the rotation of said blades for oscillating said frame to move the blades into and out of cutting position, including a rotating member associated with said blades, a control member for said frame oscillating means, and means for periodically moving said control member into position to be operated by said rotating member.

22. A shear mechanism comprising a frame, shear blades rotatively mounted in said frame, means for continuously rotating said blades, and means dependent upon the rotation of said blades for oscillating said frame to move the blades into and out of cutting position, including a rotating cam member associated with said blades, a control member for said frame oscillating means, and means for periodically moving said control member into position to be actuated by said rotating cam member.

23. A shear mechanism comprising a frame, a pair of shear blades rotatively mounted on said frame, means for continuously rotating said blades, a rotating cam member associated with said blades, pressure responsive mechanism for swinging said frame to move the blades into cutting position, a valve controlling the operation of said pressure responsive mechanism, an operating member for said valve, and means for periodically moving said valve operating member into position to be operated by said cam member.

24. A shear mechanism comprising a frame, shear blades rotatively mounted in said frame, means for continuously rotating said blades, a rotating cam member associated with said blades, pressure responsive mechanism for swinging said frame to move the blades into cutting position, a valve controlling the operation of the pressure responsive mechanism, an operating member for said valve, means for periodically moving said valve operating member into position to be actuated by said cam member, and means operable after the blades have crossed in cutting position for returning the frame to its normal position.

25. A shear mechanism comprising a frame, shear blades rotatively mounted in said frame, means for continuously rotating said blades, a rotating cam associated with said blades, pressure responsive mechanism for swinging said frame to move the blades into and out of cutting position, a valve for controlling the operation of said pressure responsive mechanism, dual members for controlling the operation of said valve, means for periodically moving one of said valve control members into position to be operated by said cam to operate said valve and actuate said frame swinging mechanism, and means carried by said cam member for actuating the other of said control members to operate the valve and permit the frame to be returned to its normal position.

26. A shear mechanism comprising a frame, shear blades rotatively mounted in said frame, means for continuously rotating said blades, means for oscillating said frame to move the blades into and out of cutting position, including a rotating member associated with said blades, a control member for said frame oscillating means, and means for moving said control member into a position to be operated by said rotating member, means for holding said blades out of contact as they cross each other when the frame is at one end of its travel, and means for moving said blades into cutting engagement as they cross each other in the cutting position.

27. A method of cutting a succession of mold charges from a suspended mass of molten glass, which comprises continuously rotating a pair of opposed blades so that the cutting edges thereof pass each other at least once during each revolution of one such blade, moving said blade while rotating to bring the point of their crossing into the confines of said mass, and timing such movement by the rotation of one such blade.

28. A method of cutting a succession of mold charges from a suspended mass of molten glass, which consists in continuously rotating a pair of opposed blades so that they pass each other at least once during each revolution of one such blade, normally holding the cutting edges of such blades out of contact as such blades pass each other during their rotation, periodically moving such blades while rotating to bring the point of their crossing within the confines of said mass and concurrently bringing such blades into contact relationship.

29. A method of cutting a succession of mold charges from a suspended stream of molten glass, which consists in continuously rotating a pair of blades so that their cutting edges pass each other at least once during each revolution of one of said blades, and periodically moving said blades during their rotation, so that each such blade moves through the axis of such stream.

30. A method of cutting a succession of mold charges from a suspended stream of molten glass, which consists in rotating a pair of opposed blades so that their cutting edges pass each other at least once during each revolution of one such blade, moving said blades while rotating toward said stream and causing the cutting edges of the same to pass each other once within the confines of such stream to sever the same and then moving such blades away from such stream while continuing their rotation.

31. A method of severing a suspended stream of molten glass into a succession of mold charges, which consists in rotating a pair of opposed blades so that their cutting edges pass each other at least once during each rotation of one such blade, moving such blades while continuing their rotation so as to shift the center of rotation of each blade and cause the passage of the edges of such blades to occur within the confines of such stream, moving the blades while rotating so as to shift the center of rotation of each blade and cause the paths of travel of each blade to clear such stream, and timing the shifting of the center of rotation of said blades by the rotation of one such blade.

32. A shear mechanism comprising opposed shear blades each mounted for rotation, means for rotating said blades so that their cutting edges pass each other at least once during each revolution of one such blade, means for shifting the position of said blades during their rotation toward and from a mass to be severed, and means controlled by the rotation of one such blade for controlling the operation of said blade shifting means.

FRANK L. O. WADSWORTH.